United States Patent [19]

Webb

[11] Patent Number: 4,907,879
[45] Date of Patent: Mar. 13, 1990

[54] REMOTE CONTROLLED LAND SURVEYING ASSISTANCE DEVICE FOR PATH RESPONSE ALIGNMENT TO BEAM ENERGY

[76] Inventor: James B. Webb, 438 Danniel Cir., Jackson, Miss. 39212

[21] Appl. No.: 144,473

[22] Filed: Jan. 15, 1988

[51] Int. Cl.[4] .................. G01B 11/26; G01C 3/08; G01C 15/02
[52] U.S. Cl. .................. 356/141; 356/1; 356/152; 356/153; 356/400; 33/293; 350/636; 350/637; 250/203.3
[58] Field of Search .............. 356/1, 4, 141, 152, 356/153, 400; 33/291, 293–295; 350/100, 636, 637; 250/201, 203 R

[56] References Cited

U.S. PATENT DOCUMENTS

| | | |
|---|---|---|
| 2,836,894 | 6/1958 | Wagner . |
| 3,469,919 | 9/1969 | Zellner . |
| 3,580,687 | 5/1971 | Hansen . |
| 3,653,774 | 4/1972 | La Roche . |
| 3,865,491 | 2/1975 | Hogan .................. 356/152 |
| 3,989,942 | 11/1976 | Waddoups .................. 356/152 X |
| 4,107,530 | 8/1978 | Brumfield et al. .......... 250/203 R X |
| 4,146,927 | 3/1979 | Erickson et al. .................. 356/5 X |
| 4,279,036 | 7/1981 | Pfund . |
| 4,413,907 | 11/1983 | Lane .................. 356/141 |
| 4,425,043 | 1/1984 | van Rosmalen .................. 356/152 X |
| 4,457,621 | 7/1984 | Harris et al. .................. 356/5 |
| 4,466,189 | 8/1984 | Tobin, Jr. . |
| 4,470,698 | 9/1984 | Green, Jr. et al. .................. 356/152 |
| 4,571,076 | 2/1986 | Johnson .................. 356/152 |
| 4,717,251 | 1/1988 | Wells et al. .................. 356/4 |

OTHER PUBLICATIONS

Tomlinson et al., "Electronic Distance Measuring Instruments," American Congress on Surveying and Mapping, Control Surveys Division, Technical Monograph No. CS-2, 1977.

Primary Examiner—Stephen C. Buczinski
Assistant Examiner—Linda J. Wallace
Attorney, Agent, or Firm—Mark P. Stone

[57] ABSTRACT

The present invention provides a land surveying assist device, which can be remotely controlled on command for path alignment. The device includes a receiver for receiving beams of energy, such as infra-red energy, from a remote transmitter source in the field. The device further includes a servo mechanism to rotate the device on-command to achieve alignment with the incoming beam path from the remote transmitter. Alignment is achieved when the incoming beams are reflected from the device back to the remote transmitter source, at which time the servo mechanism is deactivated.

20 Claims, 6 Drawing Sheets

REMOTE CONTROLLED LAND SURVEYING ASSISTANCE DEVICE FOR PATH RESPONSE ALIGNMENT TO BEAM ENERGY

DISCUSSION OF THE BACKGROUND ART

The present invention is directed to a land surveying assist device, and in particular to a land surveying assist device which is capable of being aligned on-command by a remote transmitter situated at a distant random location.

Land surveying instruments are well-known to the prior art. One such typical instrument is a theodolite which is used in the field to obtain precise angular measurements for highway construction, industrial plant layout, tunnel construction and alignment, and other civil engineering work. Other known instruments, such as the Electronic Measuring Device (EDM) may be used to determine the distance between the instrument and any randomly located field point or survey station within its effective range. In working with the known instruments in land surveying operations, it is necessary for both the instrument station and the random field location to be manned by one or more members of the survey crew. In a known manner, the crew is able to manually align the instrument with the field location so that the various required angular and linear measurements may be made. It is apparent that this alignment procedure is time-consuming and requires the combined effort of several different individuals at different locations in the area to be surveyed.

Alignment on-command of the surveying assist device with one or more remote field locations or stations would significantly reduce the time required to perform the manual operations necessary for beam-path alignment. Such on-command alignments would also drastically reduce the costs of the survey operation by eliminating much of the manpower required to complete the survey.

The following United States patents illustrate the state of the art in surveying instruments; U.S. Pat. No. 3,653,774 (La Roche); U.S. Pat. No. 3,469,919 (Zellner); U.S. Pat. No. 4,107,530 (Brumfield et al); U.S. Pat. No. 4,425,043 (Van Rosmalen); U.S. Pat. No. 2,836,894 (Wagner); U.S. Pat. No. 3,580,687 (Hansen); U.S. Pat. No. 4,279,036 (Pfund); U.S. Pat. No. 4,466,189 (Tobin, Jr.); U.S. Pat. No. 4,457,621 (Harris et al); U.S. Pat. No. 4,470,698 (Green, Jr. et al); and U.S. Pat. No. 3,989,942 (Waddoups).

The LaRoche patent (U.S. Pat. No. 3,653,774) discloses a theodolite including a servo motor used for tracking a moving target. It does not disclose on-command alignment in a land surveying procedure.

The Zelner patent (U.S. Pat. No. 3,469,919) discloses an electronic surveying instrument including a laser beam projector coupled with an angled mirror to produce horizontal datum. The disclosed device also includes a receiver for receiving reflected beams to detect a datum plane and a pair of adjustable antennas which are movable to an elevation intersecting the datum plane and adjustable to insure proper spacing and elevation of the antennas.

The Wagner patent (U.S. Pat. No. 2,836,894) discloses a theodolite useful for tracking moving objects. It does not disclose a remotely controlled land surveying assist device for aligning on-command the same with a remote field location.

The Brunfield et al patent (U.S. Pat. No. 4,107,530), the Waddoups patent (U.S. Pat. No. 3,989,942), and the Van Rosmalen patent (U.S. Pat. No. 4,452,043) each generally disclose the use of radiation detectors to track radiating objects. These patents are not directed to land surveying instruments.

The Hansen patent (U.S. Pat. No. 3,580,687) discloses a surveying instrument which detects when it is misaligned, but it provides no means for on-command alignment.

The Pfund patent (U.S. Pat. No. 4,279,036) discloses a communication system with mobile vehicles including the use of a satellite; the Tobin, Jr., patent (U.S. Pat. No. 4,466,189) discloses an optical sensor used as a navigation aid for fixing and maintaining an accurate site on a target during rough water conditions; the Harris et al patent (U.S. Pat. No. 4,457,621) discloses a surveillance system including a laser range finder for use in conjunction with a passive surveillance scanner; and the Green, Jr., et al patent (U.S. Pat. No. 4,470,698) discloses a scanning and/or tracking mechanism for use as part of either an optical obstacle avoidance or target tracking airborne radar set. It is apparent that none of the last four mentioned patents disclose instruments useful for land surveying operations.

None of the above disclosures suggest a method or apparatus for land surveying which employs an assist device at a base line station for providing remote on-command alignment of surveying instruments located at one or more distant field locations.

It is an object of the present invention to provide an improved land surveying assist device which may be remotely aligned on-command with a distant field location to significantly reduce the time, labor, and cost involved in a land surveying operation. It is a further object of the invention to provide a method and apparatus for on-command alignment of instruments at one or more distant field locations utilizing a single land surveying assist device positioned at a base line station and remotely controlled from the field locations.

SUMMARY OF THE INVENTION

In accordance with the present invention, the land surveying assist device includes an EDM or other land surveying instrument and very high frequency (VHF) hand-held transceiver at one or more randomly located survey stations or field locations, and a survey assist device including a VHF receiver or transceiver and a retroreflecting prism cluster (retro prism) at one or more base line survey stations.

During distance measurement the EDM emits infrared energy which is retroreflected at the base line survey station and detected by the EDM. To perform this operation, the EDM and retro prism must be correctly aligned. The alignment is achieved by rotating the prisms at the base line survey station using the VHF transceivers. The base line survey station transceiver, on reception of a signal from the randomly located station transceiver (i.e., when the transmit button is activated at the randomly located survey station), activates a servo motor which rotates the retro prism. Deactivating the transmit key stops rotation of the retro prism. When the retroreflected infrared energy is detected by the EDM, alignment is correct, and the EDM automatically displays the distance.

The advantages of the remotely controlled surveying assist device (RCDRP) include the fact that the surveyor/instrument man may leave the base instrument station so as to note additional details of the topography which might otherwise be ignored by a less experienced party member, or change instrument station to a more advantageous position and recompute relocated station position from data acquired from base line surveying assist devices (RCDRP) in lieu of assigning crew members to perform this particular task of manually realigning the assist device. It is apparent that the on-command alignment provided by the present device: (1) significantly reduces the cost and time for completing a survey operation; and (2) reduces the number of personnel necessary to complete the operation, and thus enables the job to be completed efficiently and economically. Additionally, a system including an assist device in accordance with the present invention may be used to sequentially remotely align several land survey instruments positioned at different field locations in the survey area in an efficient and economical manner.

DESCRIPTION OF THE BEST MODE FOR CARRYING OUT THE INVENTION

Before providing a detailed description of the invention in conjunction with the drawings, certain preliminary matters are noteworthy. The subject invention is directed to a device which is useful when employed in conjunction with standard land surveying instruments such as theodolites and electronic measuring devices. Such conventional land surveying equipment is used to determine the position of any randomly located survey station, and the structure and operation of such standard equipment is generally well-known to those skilled in the land surveying art. Accordingly, no detailed description of conventional land surveying equipment such as the theodolite, which is used in the field to obtain precise angular measurements for triangulation in civil engineering work, or the electronic measuring device (EDM) which is used in the field to measure linear distances or ranges, will be provided since such instruments are generally well-known in the art.

The land survey assist device provided by the present invention is used in conjunction with conventional land surveying instruments in standard land surveying procedures to on-command align and maintain the alignment of instruments at one or more predetermined remote field locations with a base line station. By locating a backsight on a base line station and by locating an assist device in accordance with the present invention on a second base line station at a predetermined distance apart, any random station adjacent to the base line at any arbitrary distance from the base line can be determined by the solution of the effective triangle containing side, side, angle. If the backsight is replaced with a second assist device in accordance with the present invention, the triangle solution becomes side, angle, side. The decision of which of the two solutions is to be used for a final trilateral solution will depend on the field circumstances.

The use of a land surveying system incorporating the device of the present invention may be employed for industrial development stake-out, subdivision layout, close perimeter topography on large areas, and other projects involving land surveying where time and costs are of the essence. The device can be used to remotely on-command align one or more survey instruments at one or more distant field locations with a base line station that is not required to be manned by survey personnel.

The device of the present invention includes certain major components which are briefly described as follows. A tripod is a basic piece of equipment on which, generally, all primary surveying instruments are attached, either by a threaded head or bolted to the tripod head by a threaded single bolt, tubed for optical plummet. A tribrach is an appliance bolted to the top of a tripod. The tribrach provides precision plumbing of instruments and accessories over a survey station. It is equipped with leveling screws, optical plummet, and an internal locking device for accessories. A retro prism is a precision ground reflector, responding to a beam source emission such as infrared, laser, or microwave. A retro prism cluster is a plurality of retro prisms mounted in frames in multiples of three.

Figure 1:
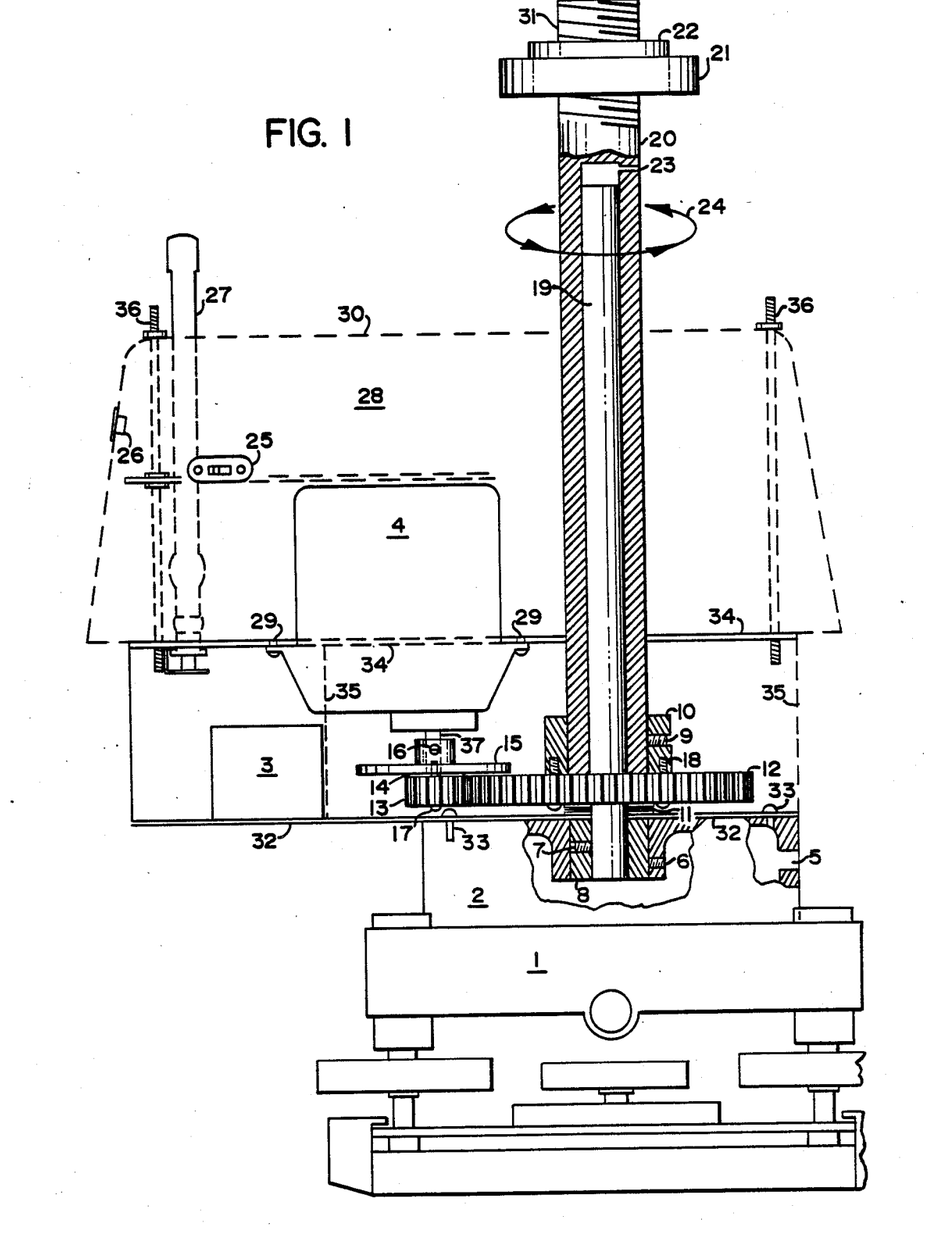
FIG. 1 of the drawings illustrates, in section, a land surveying instrument capable of remote controlled on-command alignment, in accordance with the present invention.

Turning now to FIG. 1 of the drawings, the assist device of the present invention is illustrated in detail. The base of the unit is a tribrach 2, which is center-bored to receive a bushing 8. The bushing 8 is center-bored to receive pylon support rod 19 and is installed on the pylon support rod by a set screw 7. To make this connection, it is necessary to drill access port 5 in the base adaptor 2 to install a set screw 6 which will firmly fix the pylon support rod and assembly to the base adaptor 2. A base plate 32 is fixed to base adaptor 2 by screws 33 and predrilled to accommodate the pylon support rod 19.

Still referring to FIG. 1, a thrust bearing 11 is installed over the pylon rod 19 and is supported on base plate 32. A pylon shaft 20 is drilled to accommodate the pylon support 19, and a vent 23 is drilled in the pylon shaft 20 as shown. A gear 12 support collar 10 is drilled to accommodate the pylon shaft 20, and is fixed to the pylon shaft 20 by a set screw 9. A driven gear 12 is fixed to the gear support collar 10 by machine screws 18. The pylon shaft 20 is threaded in location 31 to an optional length in order to accommodate a retro prism cluster, and is fixed in position by locknuts 21 and 22.

A support plate 34 for a motor and reduction gear assembly 4 is installed and fixed in position on side frame plates 35, which in turn are attached to and fixed in position on a base plate 32. The support plate 34 for the motor and reduction gear assembly is pre-drilled to accommodate the pylon shaft 20, and tie-down bolts 36 are installed. Also, a cut-out in the support plate 34 is provided to mount the motor and gear reduction assembly 4. The predrilling and cut-out of the support plate is done prior to installing the support plate 34 on the side frame plates 35.

Thereafter, the motor and gear reduction assembly 4 is attached to the support plate 34 by machine screws 29. The motor and gear reduction assembly 4 includes a drive motor, reduction gears, and an exterior power output shaft 37. A retainer flange 15 for the driven gear 12 is fixed on the power output shaft 37 by a machine screw 16. A pinion gear 13 is fixed on the power output shaft 37 by a machine screw 17. The pinion gear 13 engages the driven gear 12 to complete a power train, and the direction of rotation is indicated by arrow 24.

An instrument cover 30 is pre-drilled to receive the pylon shaft 20 and the tie-down bolts 36. Additionally, cut-outs are made in the instrument cover 30 to accommodate an auxiliary power receptacle 25 and an auxiliary transmitter/receiver receptacle 26. The location of the power receptacle 25 and the transmitter/receiver receptacle 26 are optional. A compartment 28 houses the transmitter/receiver and other electronic components. A battery cell 3 is provided to house an on-board battery of sufficient strength to operate the electronics, or in the alternative, power may be supplied from an external source by plugging into the external receptacle 25. An antenna 27 is mounted externally to the device and is coupled to the transmitter/receiver unit.

Figure 2:
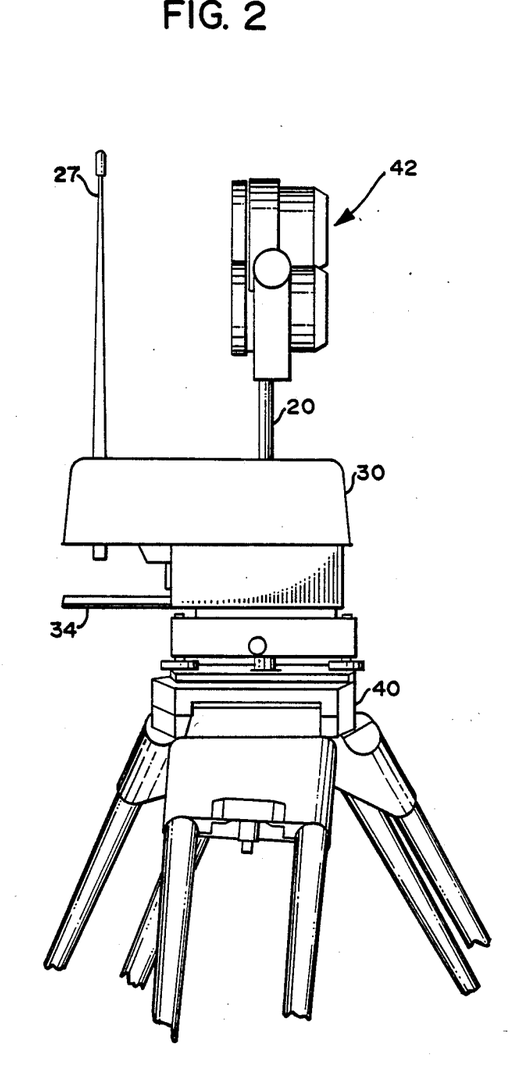
FIG. 2 of the drawings illustrates a left side elevational view of the surveying instrument illustrated by FIG. 1.
Figure 3:
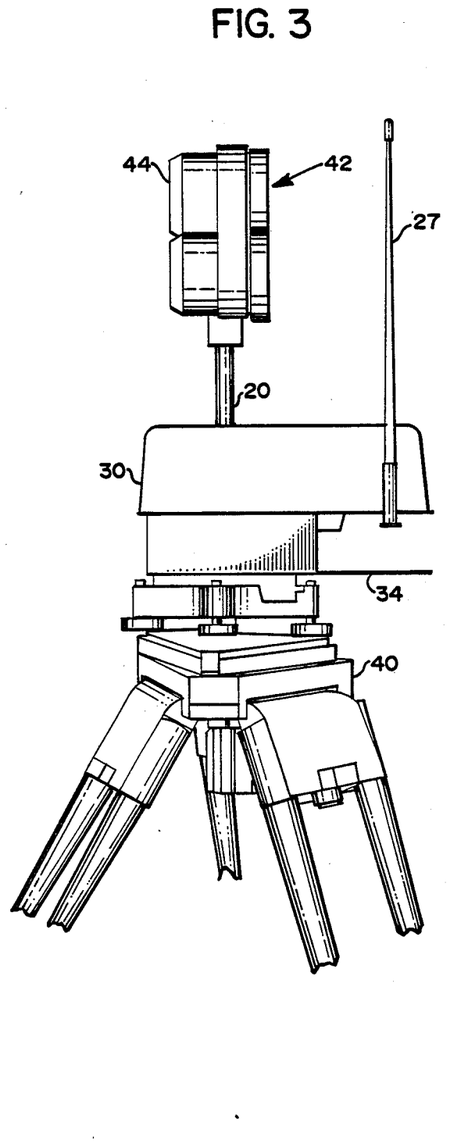
FIG. 3 of the drawings illustrates a right side elevational view of the surveying instrument illustrated by FIG. 1 of the drawings.
Figure 4:
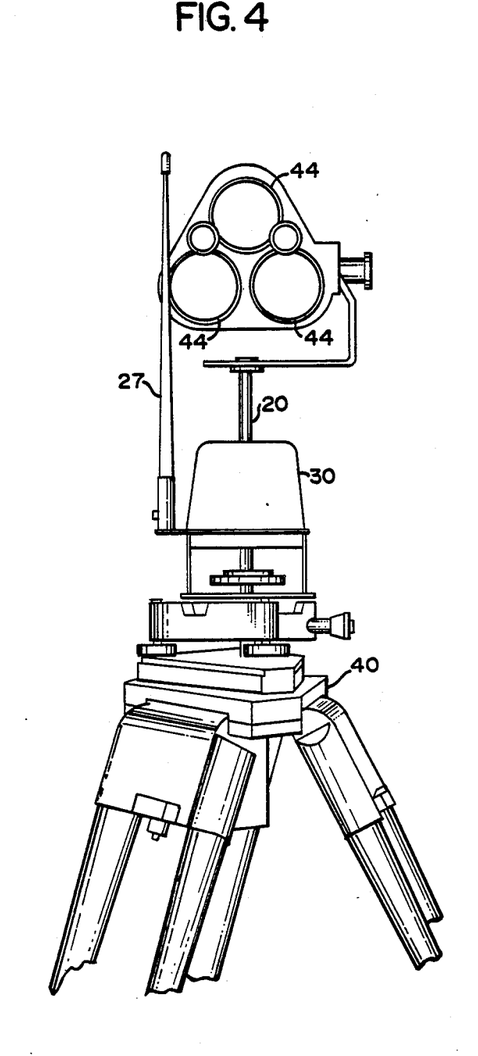
FIG. 4 of the drawings illustrates a front elevational view of the surveying instrument illustrated by FIG. 1 of the drawings.

FIGS. 2, 3, and 4 of the drawings illustrate, respectively, a left side elevational view, a right side elevational view, and a front elevational view of the device of FIG. 1. These drawing figures more clearly illustrate a tripod 40 for supporting the overall device, the pylon shaft 20 shown supporting a retro prism cluster 42 including a group of three retro prisms 44, the instrument cover 30, the support plate 34, the antenna 27, and other external components of the device.

In operation of the disclosed device, a source of beam energy, such as infrared, laser, or microwave, preferably infrared, is transmitted from a survey instrument (e.g. EDM) located in a predetermined remote field location. The infrared beam is transmitted in the direction of an assist device in accordance with the present invention which is positioned at a base line station.

The emitted energy beams (infrared) generated and transmitted by the EDM from a remote field location in an on-target mode will not respond for a linear distance readout when the retro prism cluster of the assist device at the base line station is not in proper alignment. To align, the operator, preferably located at the remote field location together with the survey instrument (EDM), activates a transmitter switch to ON and maintains the switch in a depressed mode to transmit a VHF signal. The signal is received by antenna 27 of the assist device and activates the drive motor within the motoring gear reduction assembly 4 to result in rotation of the pylon shaft 20. Rotation of the shaft necessarily causes rotation of the retro-prism cluster fixedly mounted thereto until the retro-prism cluster is moved into alignment with the incoming infrared energy, retroreflecting the transmitted infrared energy beams back to the survey instrument at the remote field location. When this occurs, the operator, on observing the read-out panel on the EDM which will indicate when alignment has been accomplished, releases the VHF transmitter switch to deactivate the signal to the motor drive assembly 4 to maintain the retro-prism cluster in alignment with the incoming infrared energy from the EDM. In this manner, the device is aligned on-command with the incoming signals from any randomly located survey station.

It is apparent that the assist device of the present invention may be employed to selectively and sequentially align a plurality of land survey instruments (EDM) located at different remote field positions in an area to be surveyed. By locating the assist device at a base line station, the operator may move from one field location to another, achieving alignment and taking measurements at each remote field location in accordance with the procedure discussed above. Preferably, the VHF transmitter operated at the remote field location to control rotation of the retro prisms is a portable unit which can be carried by the operator from one location to the next. The survey may be accomplished expeditiously and economically, and without the need to man the base line station.

Figure 5:
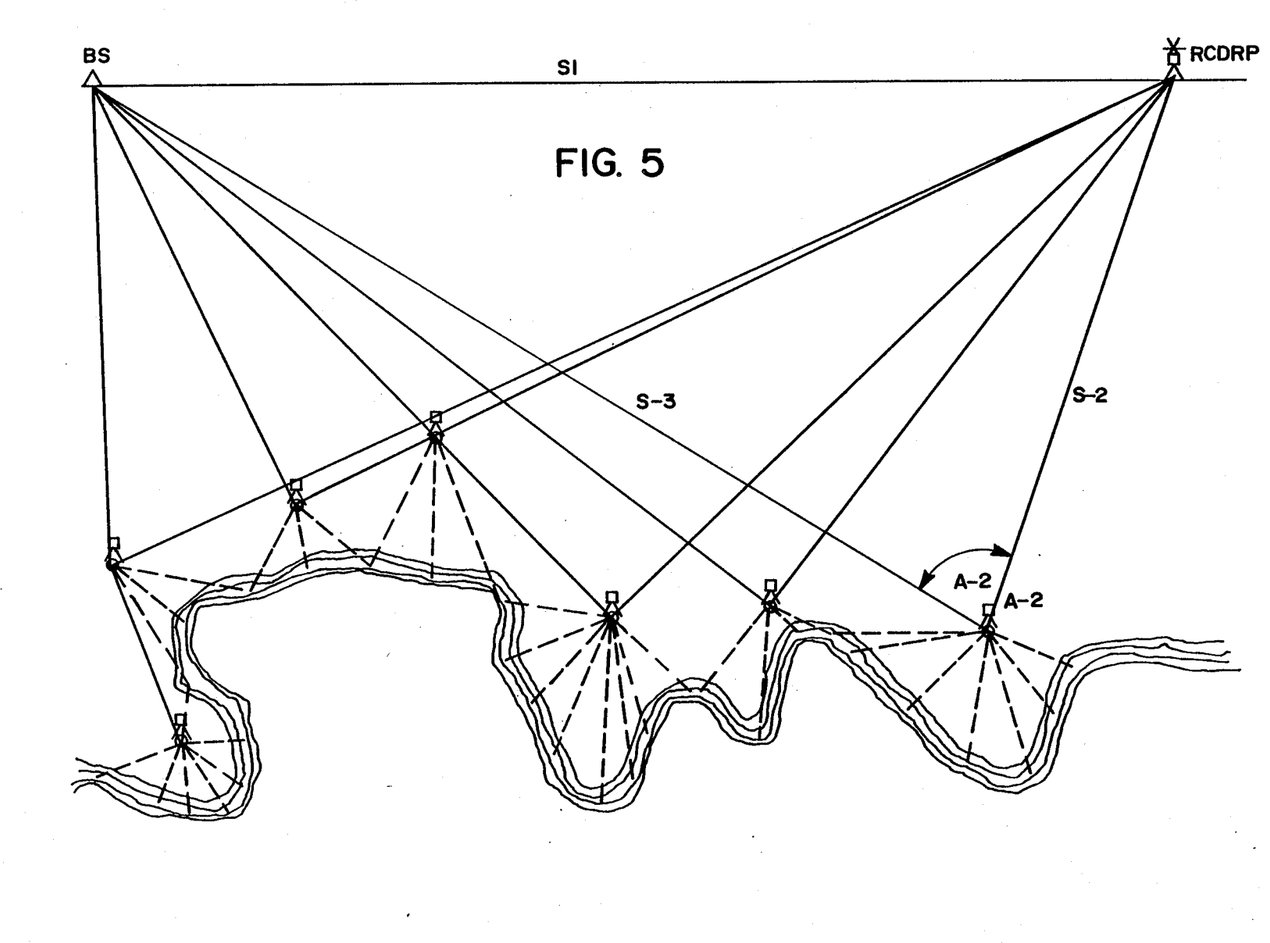
FIG. 5 is a schematic drawing of an exemplary land surveying operation using the surveying instrument of the present invention.
Figure 6:
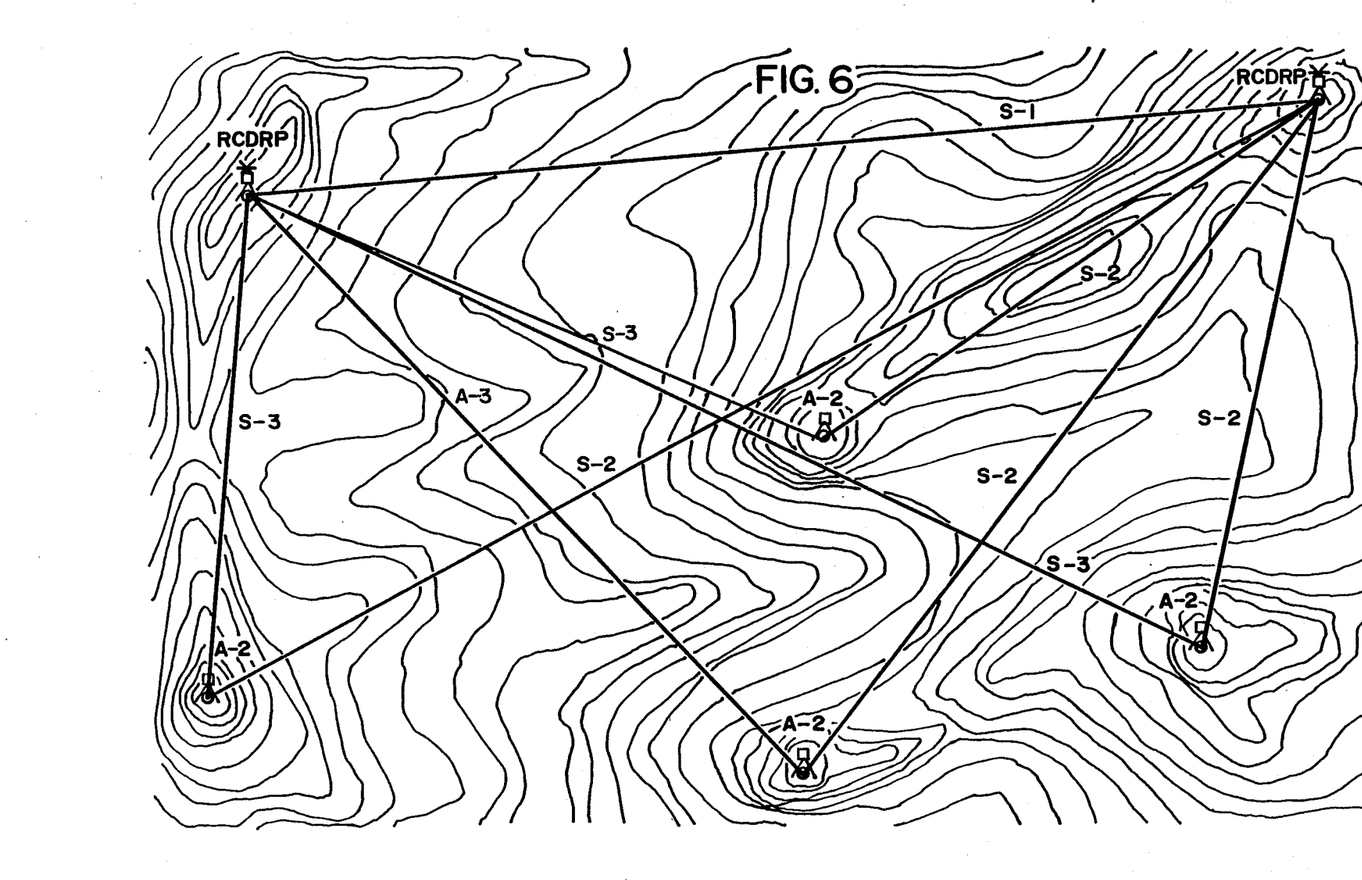
FIG. 6 illustrates a schematic drawing of a second exemplary land surveying operation using the land surveying instrument in accordance with the present invention.

Referring now to FIGS. 5 and 6 of the drawings, illustrative examples of land surveying procedures employing the device of the present invention are schematically shown. In the example illustrated by FIG. 5, a base line S-1 having a predetermined length is defined between a backsight (BS) and a survey assist device in accordance with the present invention (RCDRP). A randomly located instrument station is designated by A-2 and is spaced a distance of S-2 from the RCDRP and a distance of S-3 from the BS. An angle A-2 is defined by lines S-2 and S-3. A trilateral solution of side, side, angle may be used to determine angle A-2 and length S-2. Thus, by locating a backsight on a base line station and a device in accordance with the present invention on a second base line station at a predetermined distance away from the first base line station, any randomly located instrument station adjacent to the base line and arbitrary distance from the base line can be determined by the solution of the effective triangle containing side, side, angle. If the backsight BS is replaced with a second unit in accordance with the present invention (RCDRP), the triangle solution becomes side, angle, side. The decision of which of the two solutions will be used for a final trilateral solution will depend upon the field circumstances.

FIG. 6 of the drawings illustrate a similar survey in which a base line S-1 is defined between two RCDRP units in accordance with the present invention. A plurality of randomly located instrument stations are designated by A-2. In a manner similar to the procedure discussed with respect to the example of FIG. 5, the distances S-2 and S-3, and the angles A-2 for each of the randomly located instrument stations A-2 may be determined.

In each of the above examples, measurements from a land survey instrument at a remote field location are taken with respect to the assist device at the base line station by remote on-command alignment techniques discussed herein. As is also evident from the examples, one or more assist devices can be employed to sequentially align a plurality of land survey instruments at different remote field locations.

Since the RCDRP assist devices are aligned on-command by signal emissions from the various remotely located instrument stations A-2, a surveying operation may proceed without any attendants being assigned to man the base line stations for the purpose of realigning the retro prisms of the assist device. Accordingly, a survey operation employing an alignment on-command device in accordance with the present invention significantly reduces the number of personnel normally required to conduct the survey, saves time, and saves expense. Moreover, the individual conducting the survey is able to leave the base station and select the instrument points for the greatest coverage of radial topography. This would not be feasible using conventional survey instruments and/or methods, in which the party chief, generally the most experienced person, remains at the base station. By permitting this individual to leave the base station, he can note additional details that would probably be ignored by a less experienced party member in selecting the optimum field location to be used as the instrument points.

Other modifications and advantages of the invention described herein will become apparent to those skilled in the art. Accordingly, the discussion of the best mode for carrying out the invention is intended to be illustrative only, and not restrictive of the scope of the invention, that scope being defined by the following claims and all equivalents thereto.

I claim:

1. A land surveying assist device for providing alignment with a station, said device comprising:

reflector means adapted to reflect any energy beam to a station from which said energy beam was transmitted, receiver means for receiving an energy signal transmitted from said station, and means operatively associated with said receiver means for rotating said reflector means, upon receipt of said energy signal, to a position in which said reflector means is aligned with said energy beam transmitted from said station, said energy beam and said energy signal being different from each other, said reflected beam adapted to actuate display means in said station upon alignment of said reflected beam with said station, said land surveying assist device not including any source of visible light for achieving alignment.

2. The device of claim 1 wherein said reflector means include a retroreflector.

3. The device of claim 2 wherein said retroreflector is a retro prism.

4. The device of claim 2 wherein said retroreflector includes a plurality of retro prisms.

5. The device of claim 1 wherein said energy beam is infrared.

6. The device of claim 1 wherein said energy signal is VHF.

7. The device of claim 1 wherein said means for rotating includes a servo motor.

8. A system for land surveying for aligning a land surveying instrument in one station with another station, said system including:

a first station including reflector means, receiver means, and means for rotating said reflector means, a second station including a land surveying instrument including a display panel, means for emitting an energy beam, and means for transmitting an energy signal, said receiver means in said first station adapted to receive said energy signal transmitted from said second station for rotating said reflector means at said first station into alignment with said energy beam emitted from said second station to remotely align said land surveying instrument with said reflector means, said energy beam and said energy signal being different from each other, said first station not including a source of visible light for achieving alignment, and means for actuating said display panel on said land surveying instrument only when said land surveying instrument and said reflector means are in alignment.

9. The system of claim 8 wherein said means for transmitting said energy signal from said second station includes a switch for deactivating the transmission of said energy signal, wherein the extent of rotation of said reflector means at said first station is controlled from said second station.

10. The system of claim 8 wherein said means for transmitting is a portable transmitter.

11. The system of claim 8 wherein said energy beam emitted from said land surveying instrument is an infrared beam.

12. The system of claim 8 wherein said energy signal transmitted from said means for transmitting is a VHF signal.

13. The system as claimed in claim 8 wherein said energy beam is emitted directly from said land surveying instrument at said second station.

14. The system as claimed in claim 8 further including a plurality of said second stations, wherein each of said land surveying instruments at each of said second stations is selectively alignable with said reflector means in said first station.

15. The system as claimed in claim 14 wherein said means for transmitting said energy signal is movable between said plurality of said second stations.

16. The system as claimed in claim 8 wherein said land surveying instrument at said second station is an electronic measuring device.

17. A method of conducting a land survey by remotely aligning a land surveying instrument in one station with a reflector in another station, the step of said method including:

positioning a land surveying instrument at a first station, emitting an energy beam from said first station, transmitting an energy signal different from said energy beam from said first station towards a second station, rotating a reflector at said second station in response to receipt of said transmitted energy signal from said first station at said second station, said second station not including a source of visible light for achieving alignment, actuating a display panel on said land surveying instrument when said reflector is rotated into alignment with said energy beam emitted from said first station, and stopping the rotation of said reflector when said display panel is actuated.

18. The method of claim 17 wherein said energy beam is emitted directly from said land surveying instrument.

19. The method of claim 17 including the step of positioning a land surveying instrument at each of a plurality of said first stations, and selectively aligning each land surveying instrument with said reflector at said second station.

20. The method of claim 19 wherein said step of transmitting said energy signal is conducted by a portable transmitter, and said portable transmitter is selectively moved between said plurality of said first stations for sequentially aligning said land surveying instrument in each said first stations with said reflector at said second station.

* * * * *